United States Patent [19]

Woodman et al.

[11] Patent Number: 4,777,603
[45] Date of Patent: Oct. 11, 1988

[54] CONTROLLER FOR MULTIPLE-AXIS MACHINE

[75] Inventors: Edward C. Woodman, Newburyport; William F. Ellersick, Watertown, both of Mass.

[73] Assignee: Cybermation, Inc., Cambridge, Mass.

[21] Appl. No.: 709,542

[22] Filed: Mar. 8, 1985

[51] Int. Cl.$^4$ ............... G06F 15/46; G05B 11/28
[52] U.S. Cl. ............... 364/474; 318/599; 318/631; 364/130; 364/174
[58] Field of Search ............ 364/130, 167–171, 364/174, 400, 474, 475; 318/599, 600, 601, 603, 131

[56] References Cited

U.S. PATENT DOCUMENTS

| | | | |
|---|---|---|---|
| 3,797,320 | 3/1974 | Clampitt | 318/631 X |
| 3,812,474 | 5/1974 | Linn et al. | 340/172.5 |
| 3,857,025 | 12/1974 | English et al. | 235/151.11 |
| 3,878,983 | 4/1975 | Hamill, III et al. | 235/151.11 |
| 3,887,796 | 6/1975 | Trousdale et al. | 235/151 |
| 4,041,287 | 8/1977 | Kolell et al. | 235/151.11 |
| 4,059,746 | 11/1977 | Haga | 364/107 |
| 4,060,851 | 11/1977 | Nakatsukasa et al. | 364/900 |
| 4,068,297 | 2/1978 | Komiya | 364/107 |
| 4,135,239 | 1/1979 | Hamill, III et al. | 364/107 |
| 4,138,632 | 2/1979 | Pauwels | 318/599 |
| 4,164,693 | 8/1979 | Leenhouts | 318/573 |
| 4,225,928 | 9/1980 | Ohkubo | 364/474 |
| 4,259,626 | 3/1981 | Nomura et al. | 318/599 |
| 4,270,868 | 6/1981 | Morgan et al. | 318/599 X |
| 4,376,970 | 3/1983 | Ilseman et al. | 364/167 |
| 4,396,976 | 9/1983 | Hyatt | 364/167 |
| 4,404,507 | 9/1983 | Dean et al. | 318/570 |
| 4,562,393 | 12/1985 | Loyzim et al. | 318/599 X |
| 4,571,530 | 2/1986 | Sweeney, Jr. | 318/599 X |
| 4,588,936 | 5/1986 | Itoh et al. | 318/599 X |

Primary Examiner—Joseph Ruggiero

[57] ABSTRACT

Movement of a tool relative to a workpiece along each one of a plurality of axes is controlled by digitally providing a train of digital pulses to an electromechanical actuator and by digitally modulating the pulse widths (without an intervening conversion to analog form) so that electrical energy is carried in the pulse train at rates which will cause the actuator to tend to produce an intended sequence of speeds and positions.

31 Claims, 13 Drawing Sheets

CONTROLLER FOR MULTIPLE-AXIS MACHINE

BACKGROUND OF THE INVENTION

This invention relates to controlling the relative movements of a tool and a workpiece in a multiple-axis machine, for example a three-axis cutting machine.

In typical controllers for such machines, information about a desired sequence of cutting tool movements is provided from a punched tape or a host computer. The actual movements along the three axes are then produced by motors or electromechanical actuators which are powered in accordance with control signals delivered by the controller. Position encoders sense the actual positions of the tool and generate position feedback signals for use by the controller.

Traditionally, the motors are of the linear torque DC type driven by analog drive amplifiers.

With digital processor-based numerical controllers, two approaches are taken to converting the digital output of the processor to an appropriate form for driving the machine.

In one approach the linear torque DC motors are replaced by stepper motors, and digital output pulses from the processor step the motor in an open loop system. The stepper motor advances a fixed amount with each pulse so that the number and rate of output pulses directly control the position and speed of the machine.

In the other approach, linear torque motors were used in a feedback loop in which the digital commands from the processor were converted first to analog drive values, and then the analog drive values were converted to pulse width modulated form. Feedback was provided by a position encoder to the digital processor, and by an independent analog tachometer to a pulse width modulation or DC power amplifier.

SUMMARY OF THE INVENTION

The general feature of the invention is that a train of digital output pulses are delivered directly to an electromechanical actuator to produce the movement along each axis, and the pulse widths are digitally modulated so that electrical energy is carried in the pulse train at rates which will cause the actuator to tend to produce an intended sequence of speeds and positions.

Preferred embodiments include the following features. The modulation of the pulse width is based in part on (a) a speed error factor (representing a characteristic speed error of the movement of the tool) multiplied by the difference between a digitally calculated actual speed signal and a current actual intended speed, and (b) a lag gain factor multiplied by the difference between a sensed digital actual position signal and a current intended position. The pulse train has a frequency in the audible range higher than 60 hertz, preferably betweeen 100 hertz and 5 kilohertz, most preferably 1 kilohertz. The pulses have opposite polarities respectively for motion in opposite directions along the axis. The actuator can be kept in a warmed-up condition, but without movement, by dithering the pulses back and forth between the two polarities. The pulse train can be positively shut off which allows noise-induced position errors, such as from starting an arc torch, to be ignored. The pulse train is generated first as a train of digital logic pulses which are then digitally amplified to form the digital output pulse train for the actuator. The width of the pulses is updated at a rate (for example 100 hertz) which is at least an order of magnitude slower than the modulation frequency of the pulse train. The intended positions of the tool relative to the workpiece are approximated by a hypothetical series of connected linear steps and the intended speeds by hypothetical rates at which the linear steps occur. In each calculation cycle, a number of steps are counted corresponding to a current intended position and a current intended speed. The size of each hypothetical step is small enough (for example 0.0005") relative to the inertia characterizing the movement of the tool so that the hypothetical steps result in smooth tool movement. The steps are generated by a step-wise linear interpolation algorithm. The speed/accuracy range is variable based on a speed/accuracy parameter by adjusting the rates at which the steps are issued and the size of each hypothetical step. The speed can be as high as 90,000 inches per minute. The rates at which steps are issued are changed at appropriate times to cause desired changes in intended speeds. The actuator is a linear torque motor. There are two axes or three axes. The tool is a torch and the workpiece a sheet of metal from which a part is to be cut. Control is provided by a programmed digital processor.

The system provides accurate, economical control of tool movement. By feeding the digitally modulated pulse width digital signals directly to the actuator, without intervening conversion of digital signals to analog form and then from analog form to pulse width modulation, susceptibility to noise is reduced and the control loop becomes accessible to a variety of digital control techniques. Linear torque motors, rather than stepper motors, can be used. By calculating actual speed digitally the control of speed can be made part of the digital control loop. By including in the control loop a term based on speed error, the controller can be tailored to the machine so that cutting errors caused by speed error are limited. Using a modulation frequency in the audible range permits a simpler, more economical implementation. Dithering limits the need to warm up the machine before each cutting session begins. By positively shutting off power to the actuator, positional errors which might otherwise be caused by noise generating events (for example by the high-frequency signal required to start an arc torch) are limited. The use of a step wise linear interpolation algorithm simplifies implementation. The speed/accuracy parameter gives the user the ability to easily trade off speed and accuracy, and to obtain extremely high speeds.

Other advantages and features of the invention will become apparent from the following description of the preferred embodiment, and from the claims.

DESCRIPTION OF THE PREFERRED EMBODIMENT

We first briefly describe the drawings.

DRAWINGS

FIG. 1 is a block diagram of a 3-axis cutting system.
FIG. 2 is a block diagram of the controller of FIG. 1.
FIG. 3 is a schematic diagram of a representative switching amplifier of FIG. 1.
FIG. 4 is a timing chart of a dithering technique.
FIG. 5 is a representation of a square part to be cut.
FIG. 6 is a flowchart of user command.
FIG. 7 is a flowchart of part loading.
FIG. 8 is a flowchart of part running with respect to two axes.

Figure 17:
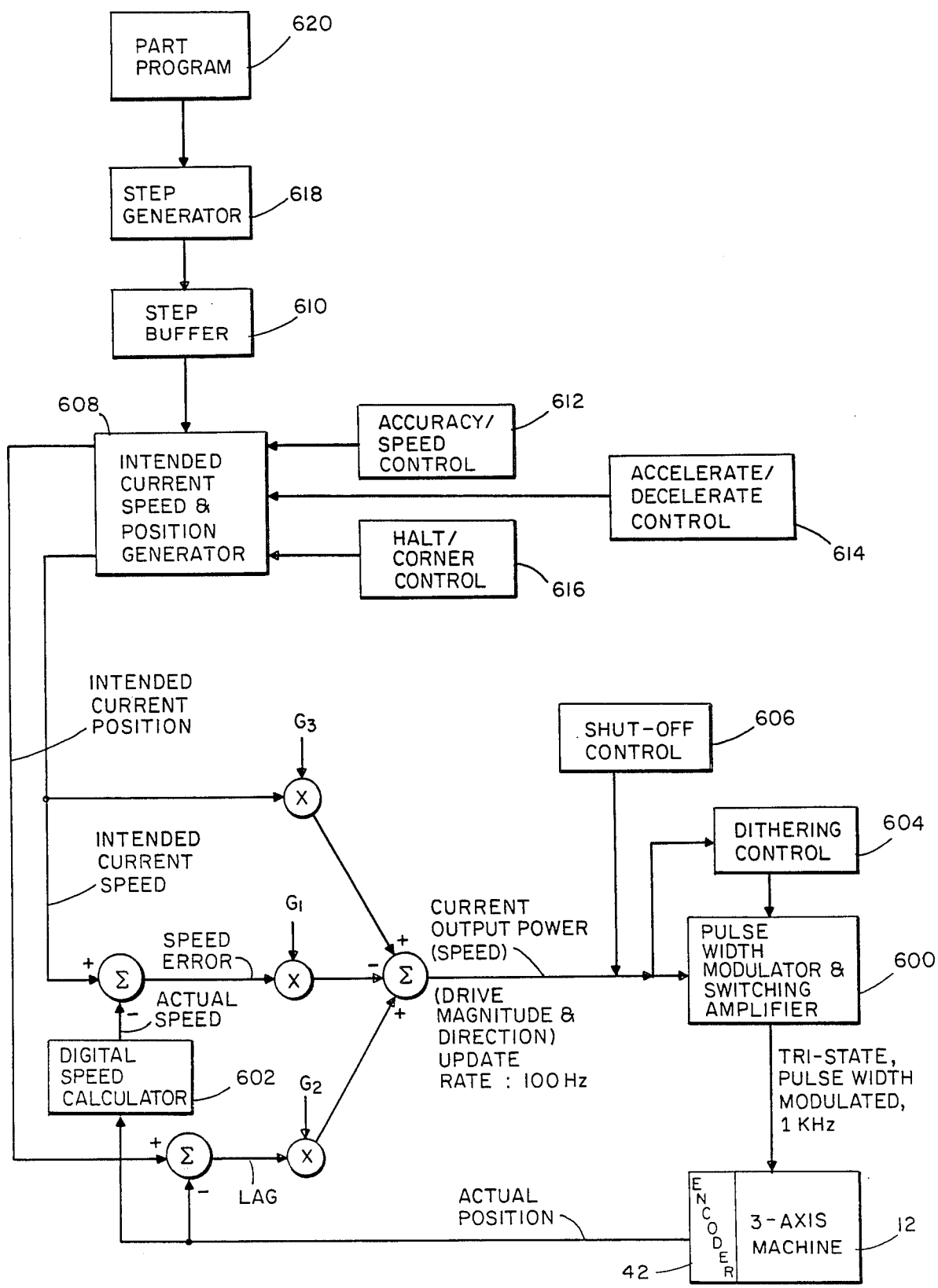

FIG. 17 a block diagram of the control loop.

STRUCTURE AND OPERATION

Figure 1:
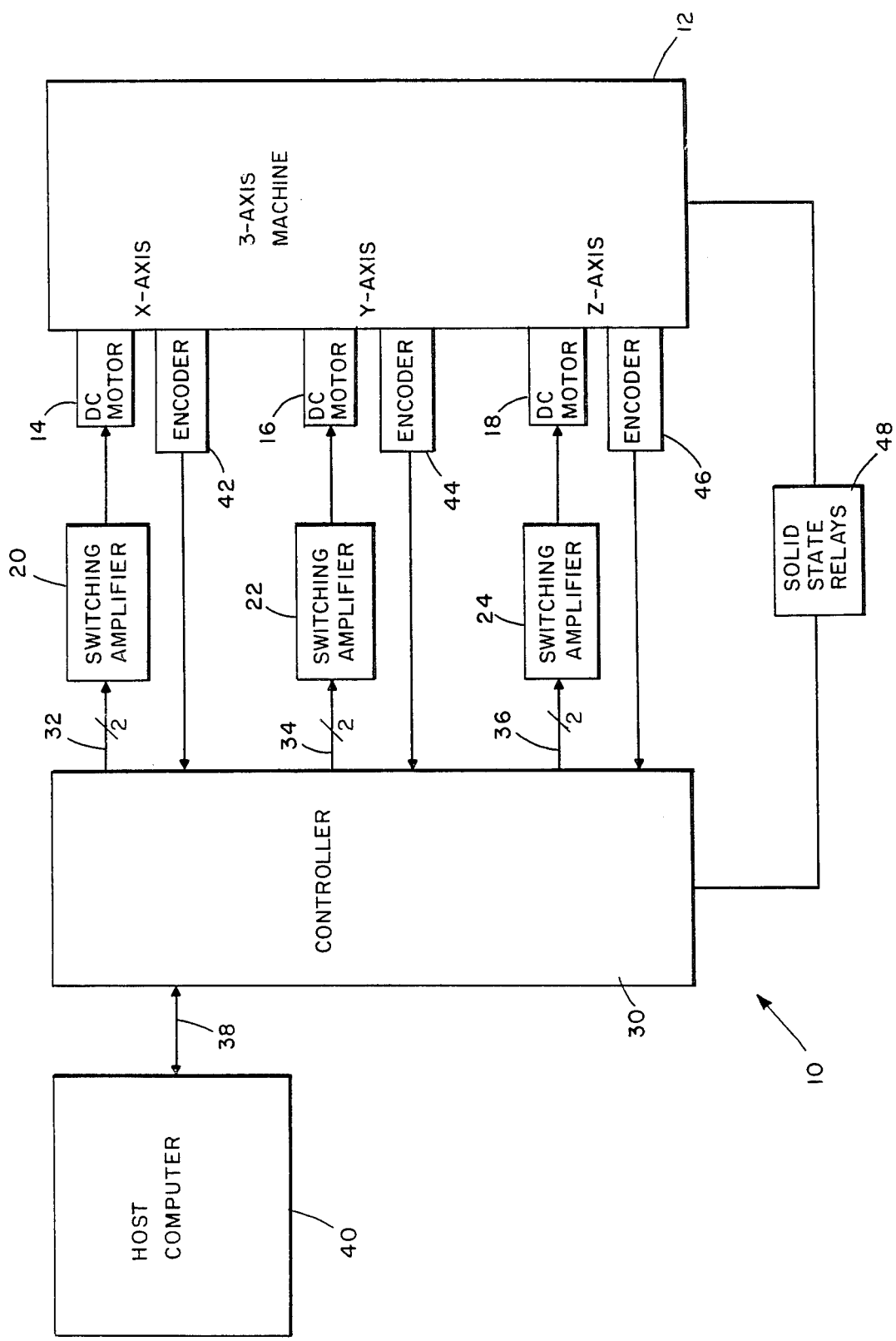

Referring to FIG. 1, 3-axis cutting system 10 has a 3-axis cutting machine 12 which includes a tool (not shown) for cutting a workpiece, and a mechanism (not shown) for moving the tool relative to the workpiece along any of three mutually perpendicular axes of motion (x-axis, y-axis, and z-axis). Movements along the three axes are produced respectively by three linear torque DC motors 14, 16, and 18.

Each DC motor is powered by pulse width modulated power signals from a corresponding switching amplifier, 20, 22, 24. The pulses of the output signal from each switching amplifier can have either one polarity or the opposite polarity to drive the corresponding motor either clockwise or counterclockwise, thus accomplishing motion in either direction along the corresponding axis. The amount of power delivered to each motor and hence its torque is regulated by varying the width of the pulses.

Switching amplifiers 20, 22, 24 are connected to receive pulse width modulated logic signals from a digital controller 30 respectively over lines 32, 34, 36.

Controller 30 is also connected to three position encoders 42, 44, 46. Each encoder senses motion along one of the three axes and feeds back incremental position pulses to the controller 30 indicative of both distance and direction moved along that axis.

Controller 30 delivers the logic signals to lines 32, 34, 36 based on information about desired cutting paths and speeds (e.g., the paths and speeds required for cutting out a particular metal part) received over a communication line 38 from a host computer 40, and based on actual positions and speeds derived from the encoder feedback pulses.

Controller 30 is also connected via solid state relays 48 to machine 12 to control other aspects of the machine operation, for example turning a torch cutting tool on and off. For this purpose controller 30 delivers parallel logic signals to relays 48 which then deliver correspondingly higher power parallel drive signals to machine 12.

Figure 2:
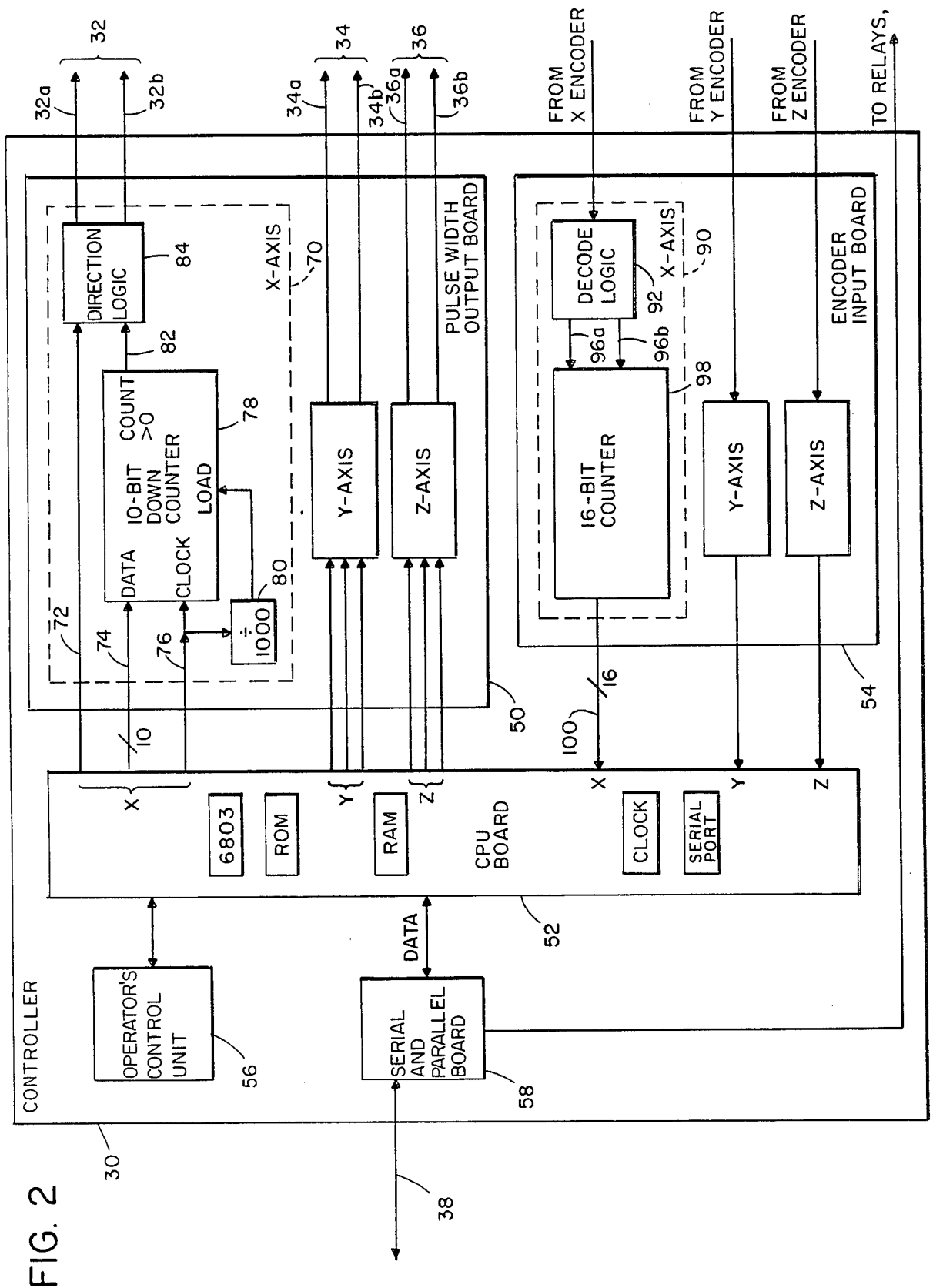

Referring to FIG. 2, controller 30 includes a pulse width output board 50 which delivers the pulse width modulated logic signals to lines 32, 34, 36. An encoder input board 54 is connected to receive the outputs of the x, y, and z encoders. The pulse width output board 50 and the encoder input board 54 are both connected to a programmed CPU board 52 which includes an 8-bit 6803 single chip computer, a ROM, a RAM, a clock, and a serial port. An operator's control unit 56 containing operator interfaces is connected to the CPU. A serial and parallel board 58 is connected between the CPU and the host communication line 38 for the CPU to receive serial output information from the host computer 40 and between the CPU and relays 48 for the CPU to deliver parallel command signals to relays 48.

Pulse width output board 5 has three identical portions respectively serving the three axes; only the x-axis portion 70 is shown in detail in FIG. 2. X-axis portion 70 is connected to CPU 52 by three wires 72, 74, 76. Wire 72 carries a one-bit logical value indicating whether the x motor should be driven clockwise or counterclockwise. Wire 74 carries a 10-bit logical value representing a drive amplitude indicating the current output power at which the x motor is to be driven. Wire 76 carries 1 megahertz clock pulses.

In x-axis portion 70, a 10-bit down counter 78 is connected to receive the 10-bit drive amplitude values at its data input, the 1 megahertz clock pulses at its clock input, and a 1 kilohertz pulse train at its load input (from line 76 via a divide-by-1000 element 80). As long as its count is greater than zero, the down counter 78 delivers a logical high signal over a line 82 to direction logic 84; otherwise a logical low signal. Direction logic 84 also receives the drive direction signals carried on line 72. The direction logic delivers clockwise pulse width modulated logic signals over line 32a, and counterclockwise pulse width modulated signals over line 32b.

Every 1/1000 second, down counter 78 is loaded with the 10-bit value appearing on line 74 and counts down to zero at the rate of 1 megahertz; then its output on line 82 goes low until the counter is loaded again. Thus, the signal on line 82 is pulse width modulated at a frequency of 1 kilohertz and the % duty cycle is determined by the 10-bit value on line 74. A smaller 10-bit value produces a lower % duty cycle, hence a lower power level to the DC motor, and hence a lower force along the x axis.

Because the modulation frequency of the pulse-width modulating amplifier embodied in the pulse width output board (i.e., the frequency at which its output signal repeats) is 1 KHz, the motors to which the pulse width modulated power signals are delivered vibrate at a frequency in the audible range and produce a faint whine when powered. The 10-bit down counters are implemented by an integrated counter chip (Motorola 6840) which has three 16-bit counters and associated buffers and latches to interface directly to the 6803 microprocessor on the CPU board.

Using a modulation frequency of 1 KHz (about 10 times the 100 Hz rate at which part cutting steps are executed, as described below) avoids the distortion which would otherwise result in conventional 60 Hz modulation frequency systems from discontinuous changes in the input to the modulating amplifier which occur asynchronously with the modulating frequency. At the same time, costly fast switching transistors and integrated circuits of the kind needed for non-audible modulating frequencies above 20 kilohertz are not required. The 1 kilohertz frequency also allows 10 bits of resolution using a conventional 1 MHz clock. Other modulation frequencies in the range 100 hertz to 5 kilohertz would also be advantageous for similar reasons.

Direction logic 84 delivers the pulse width modulated output over line 32a if the intended direction is clockwise, or over line 32b if the intended direction is counterclockwise.

Encoder input board 54 also has three portions respectively serving the three axes; only x-axis portion 90 is shown in detail in FIG. 2. The x-axis portion 9 includes decode logic 92 which receives the incremental position pulses from the x encoder 42, determines whether they represent clockwise or counterclockwise motion, and, depending on which they represent, delivers them respectively over lines 96a, 96b to a 16-bit up-down counter 98. Counter 98 counts up for clockwise pulses received over line 96a and down for counterclockwise pulses received over line 96b. Thus the 16-bit logical count in counter 98, which is delivered over data lines 100 to the CPU board, represents the actual x-axis position. The CPU board uses the change in x-axis position over time to determine the actual x-axis velocity.

Figure 3:
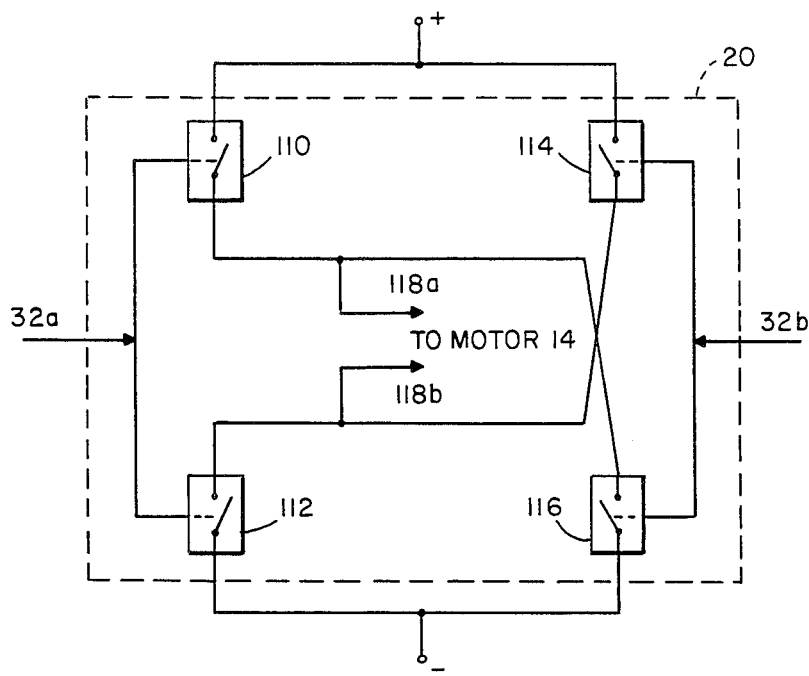

Referring to FIG. 3, switching amplifier 20 (and likewise amplifiers 22, 24) contains four high speed switching power transistors represented by blocks 110, 112, 114, 116. Switches 110, 112 are connected to deliver voltage pulses of one polarity and of the opposite polarity respectively to leads 118a, 118b corresponding to clockwise pulses on line 32a, thus driving motor 14 in the clockwise direction at a power level governed by the pulse width. Likewise switches 114, 116 are connected to deliver respectively opposite polarity voltage pulses to leads 118a, 118b corresponding to counterclockwise pulses on line 32b, thus driving motor 14 in the counterclockwise direction at a power level governed by the pulse width.

Accordingly, the pulse width output board, switching amplifiers, and DC motors will cause torque in either direction along each of the three axes in accordance with the 10-bit drive amplitude and drive direction (current output power) signals provided by CPU 52. The encoders and encoder input board will feed back to CPU 52 the actual position along each of the three axes.

Each DC motor can be positively disconnected from power to stop any motion along the corresponding axis by driving both lines 32a and 32b low. In effect then, lines 118a, 118b provide a tri-state output to motor 14, the states being either (a) pulse width modulated for clockwise motion, (b) pulse width modulated for counterclockwise motion, or (c) off with no power being delivered to the motor.

The ability to turn the switching amplifier off, resulting in absolutely no power to the motors, allows noise-induced position errors in machine 12 to be ignored, for example errors induced by an electrically noisy event, such a the firing of a plasma torch. In that case, the electrical noise, which is caused by a high voltage, high frequency signal sent to the plasma torch to start the arc, diminishes after the torch starts. The only components of system 10 that are affected by the high voltage, high frequency signal are the encoders 42, 44, 46, which must be mounted on the beam near the torch. Before firing the plasma torch, controller 30 brings machine 12 to a halt, turns the switching amplifiers completely off, and monitors the position. When no movement has been detected for one second, the controller records the position of the machine. The plasma torch is then fired. When the plasma arc has been established, a signal is sent back to the controller. The controller then reads the (possibly noise affected) position of the machine, and ignores any changes from the recorded position, thus preventing loss of positioning information.

Figure 4:
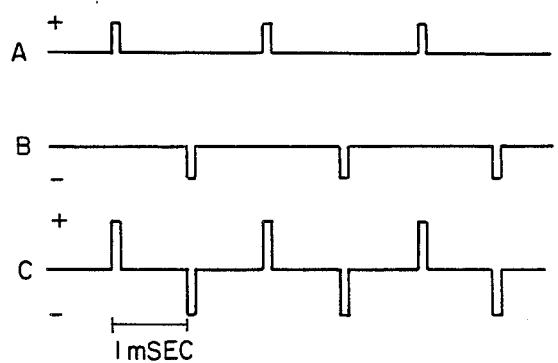

Whenever the CPU board determines that machine 12 should be at rest, the pulse width output board is caused to operate in a special dithering mode. Referring to FIG. 4, in the dithering mode, the outputs of the pulse width output boards are pulses which have a 3% duty cycle and alternate between clockwise and counterclockwise. FIG. 4 at parts A and B respectively show the clockwise and counterclockwise output pulses from the pulse width output board. FIG. 4 at part C shows the resulting output of the switching amplifier. The 3% duty cycle pulses cause the motors to stay warm, but are insufficient to cause rotation of the motor shafts. Thus, no motion occurs (as desired), but the motors are kept warm, minimizing the need to exercise the motors after an idle period before resuming cutting.

The speeds and durations of motion along each of the three axes are specified by CPU board 52 based on information delivered over line 38 indicating (among other things) sequences of lines and arcs necessary to cut a desired part.

Figure 5:
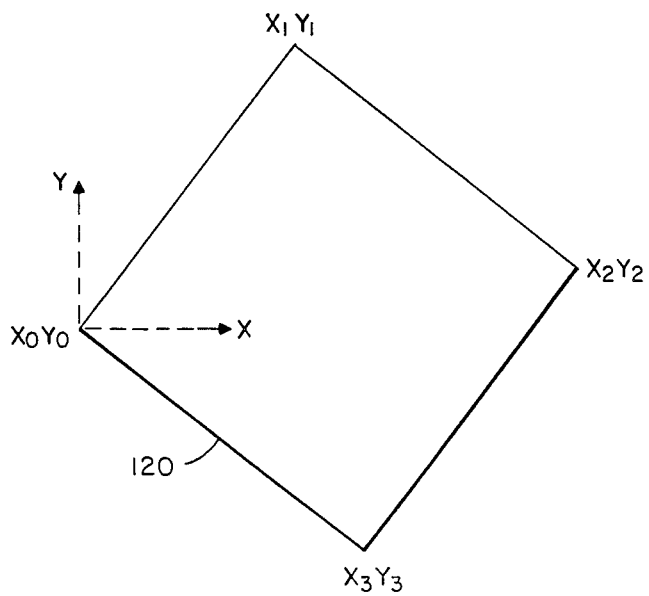

Referring to FIG. 5, to cut a square part 120 from a metal sheet lying on the x-y plane, for example, the information provided from the host computer would be the coordinate values of the four corners of the square. To cut the part requires beginning at one of the corners (e.g., $x_0 y_0$) and moving around the square to each successive corner ending at the original corner. The information provided from the host computer might also include instructions such as turn on cutting torch, halt, turn off cutting torch, and end of part. The information provided to CPU board 52 from the host is typically coded in accordance with a part programming convention, such as ESSI or EIA.

Figure 6:
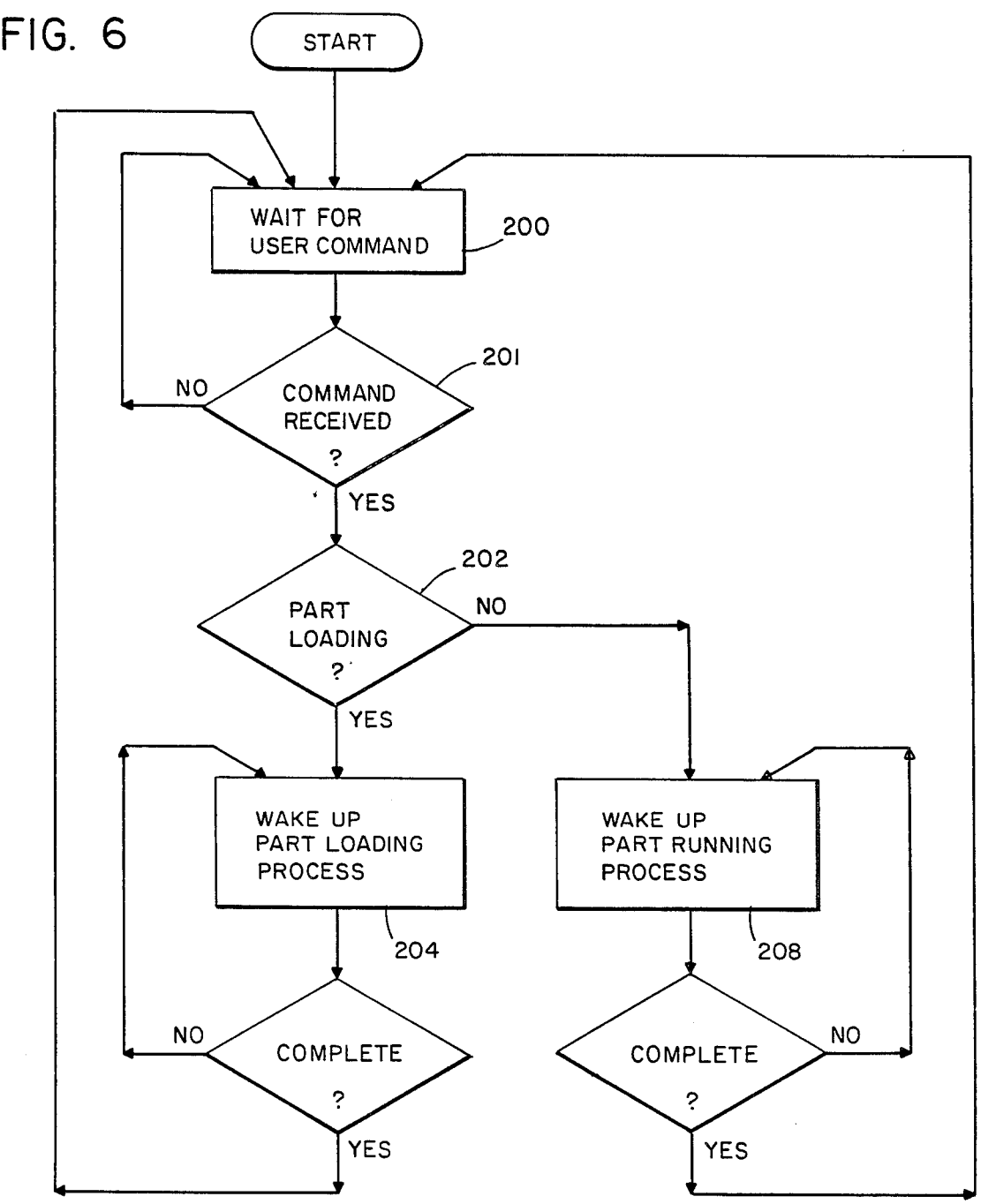

Referring to FIG. 6, there are two major processes, part loading and part running, each carried out by CPU board 52, when called by the user. (The CPU carries out the processes in accordance with a computer program written in the 6803 assembler and C languages.)

Initially, the CPU waits (200) to receive a user part load or part run command from the operator's control unit 56. When a command is received (201), if it is a command for part loading (202), the user command program wakes up the part loading process (204) and then returns to await the next user command. If it is a command for part running, the user command program wakes up the part running process (208) and then returns to await the next user command.

Figure 7:
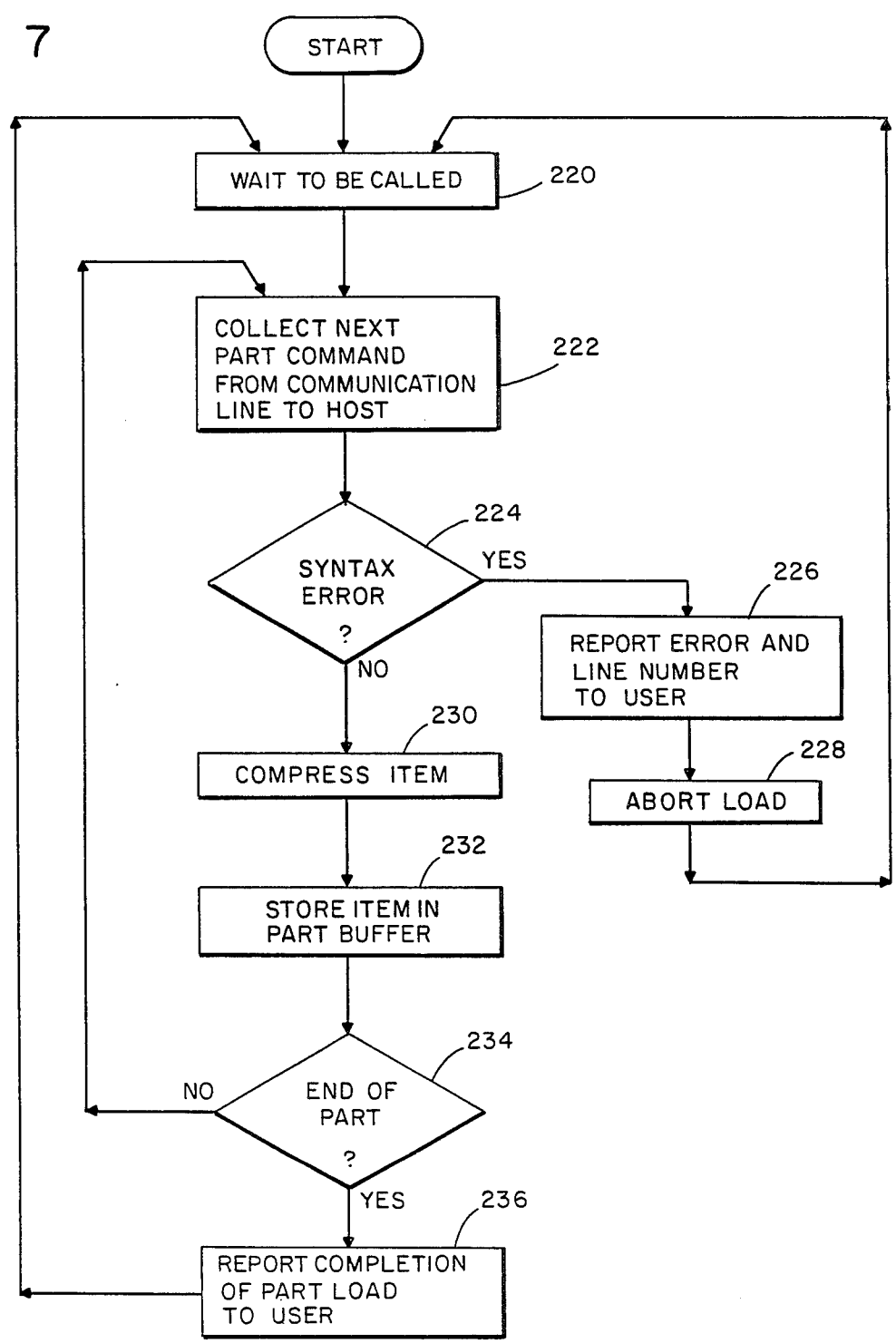

Referring to FIG. 7, the part loading process loads from the host computer into the controller the sequence of instructions (part commands) required to cut a desired part.

The part loading process initially waits to be called (220). When called by the operator, it collects the next part command (222) from communication line 38 via serial/parallel board 58. The part command is checked for syntax errors (224). If any error is found it is reported back to the user (226) via operator's control unit 56; the load is then aborted (228) and the part loading process waits to be called again.

If no syntax error is found, compression (230) is used to reduce the bit length of the part command in order to save storage space. The compressed item is stored (232) in a part buffer within the memory of CPU board 52 and subsequent items are collected until the end of the part is reached (234). The completion of part load is reported to the user (236).

Figure 8:
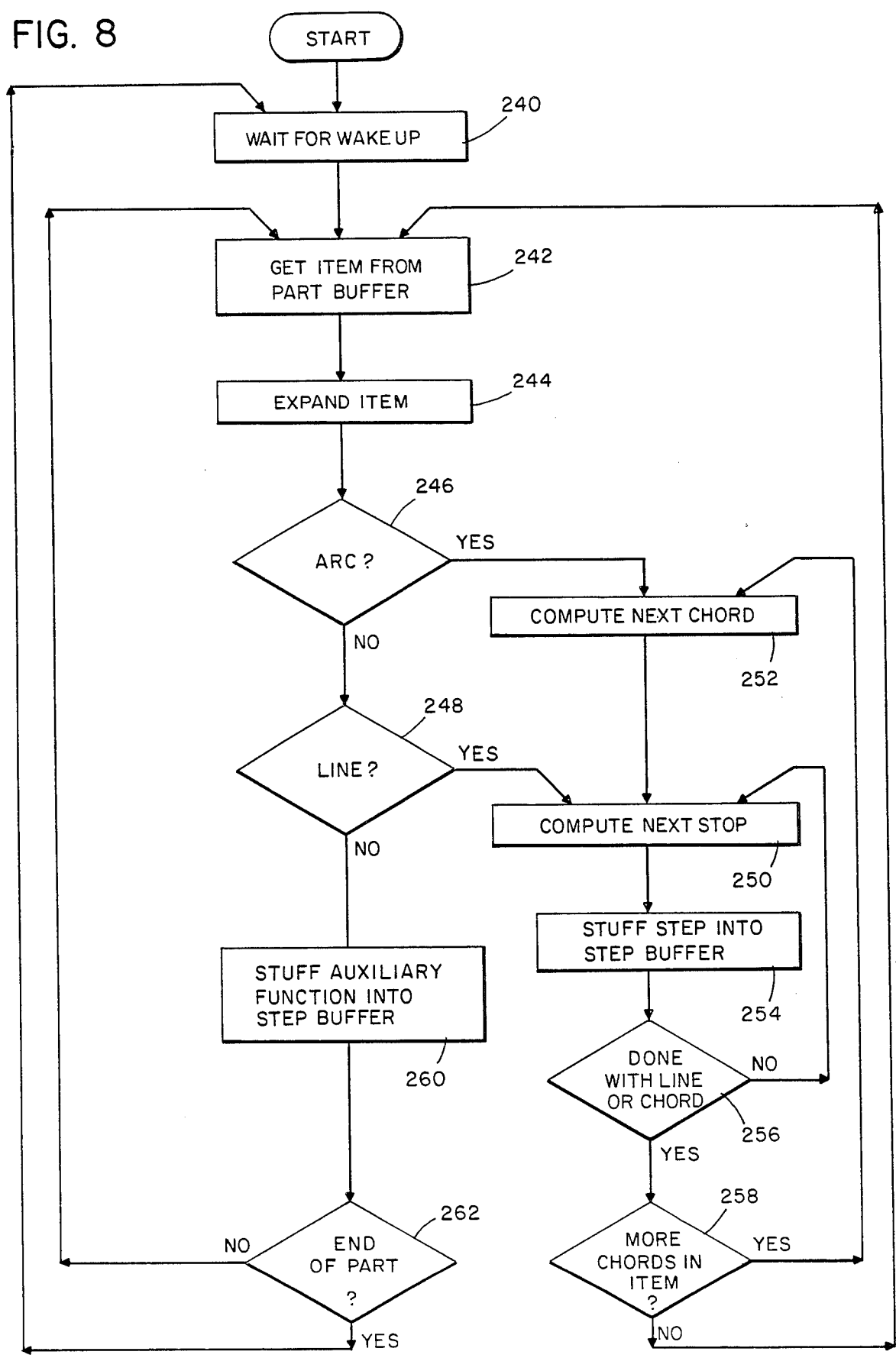

Referring to FIG. 8, the part running process is the procedure by which the desired part is cut based on the stored part commands.

The part running process initially waits to be called (240). When called by the operator, it gets (242) the next part command (previously loaded into the part buffer) and expands (244) the part command (the reverse of compression).

There are three types of part commands which are recognized by the controller: arcs, lines, and auxiliary functions. Lines represent straight line cuts to be made, for example, the cut along one side of the square of FIG. 5. Arcs represent circular cuts to be made. Auxiliary functions represent other actions to be taken, for example turning on the torch to begin a cut.

Each line can be represented by a series of short steps and each arc by a series of short chords (which in turn can be represented by a series of short linear steps) according to algorithms to be described below.

Referring again to FIG. 8, after expanding an item, the CPU determines whether the part command is an arc (246), a line (248), or an auxiliary function. If a line, the CPU uses the line algorithm to compute the next cutting step along the line (250). If an arc, the CPU first uses the arc algorithm to compute the next chord (252) along the arc and then proceeds to compute the next linear step along the chord (250). In either case, the next step, once computed, is stuffed into the next location in a step buffer (254) in the memory of CPU board 52. If the line or chord is not then completed (256), the next step is computed. If the line or chord is completed but there are more chords in the arc (258), the next chord is computed. When the line or arc is finished, the CPU gets the next part command from the buffer.

If a part command is an auxiliary function, it is stuffed (260) into the step buffer. When the last part command for the part is reached (262), the process returns to wait to be called again.

Thus, the part running process gets each part command in turn, calculates each next step or next action to be taken and stuffs it into the next location in the step buffer, which is configured as a ring buffer. What is stored in the ring buffer at any given time is the upcoming sequence of ideal steps the performance of which would carry out the cutting for at least a portion of the desired part. As time progresses and the cutting is being performed, the oldest steps in the buffer are used and additional steps are calculated and loaded in. In metal cutting, typical steps will represent cuts of 0.005" length. The execution of the cutting is performed in a manner to be explained below, but first we turn to a description of the algorithms for generating the cutting steps corresponding to part command lines and arcs.

Figure 9:
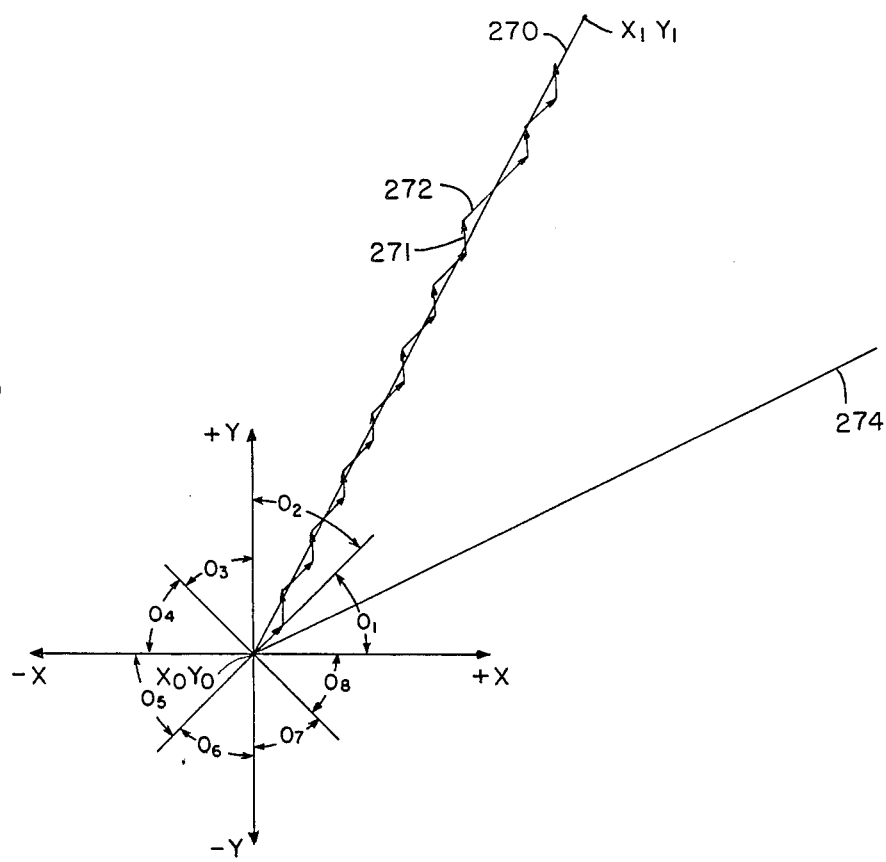
FIG. 9 is a representation of the steps used to approximate a line cut.

Referring to FIG. 9, any straight line 270 from a point $x_0y_0$ to a point $x_1y_1$ can be approximated by a series of small steps of two different kinds: one kind 271 are steps of one unit each along a particular one of either the x axis or y axis (the y-axis in the case of FIG. 9); the other kind 272 are steps along a 45° diagonal corresponding to combined one unit steps along both axes. The x-y plane can be divided into eight octants (labeled $O_1$–$O_8$) arranged around the starting point $x_0y_0$ of line 270. Any line 270 then lies entirely in one of the octants. For example, line 270 lies in octant $O_2$. Furthermore, for each octant, we can designate as a major axis the axis along which the greater distance is traversed by those lines falling within the octant; the other axis for that octant is designated the minor axis. For example, in octant $O_2$, +y is the major axis, +x the minor. Then line 270 can be approximated by a series of interleaved major axis steps 271 (called major steps) and steps 272 along the diagonal (called minor steps). Note that each minor step corresponds to combined unit steps along the major and minor axes.

Figure 10:
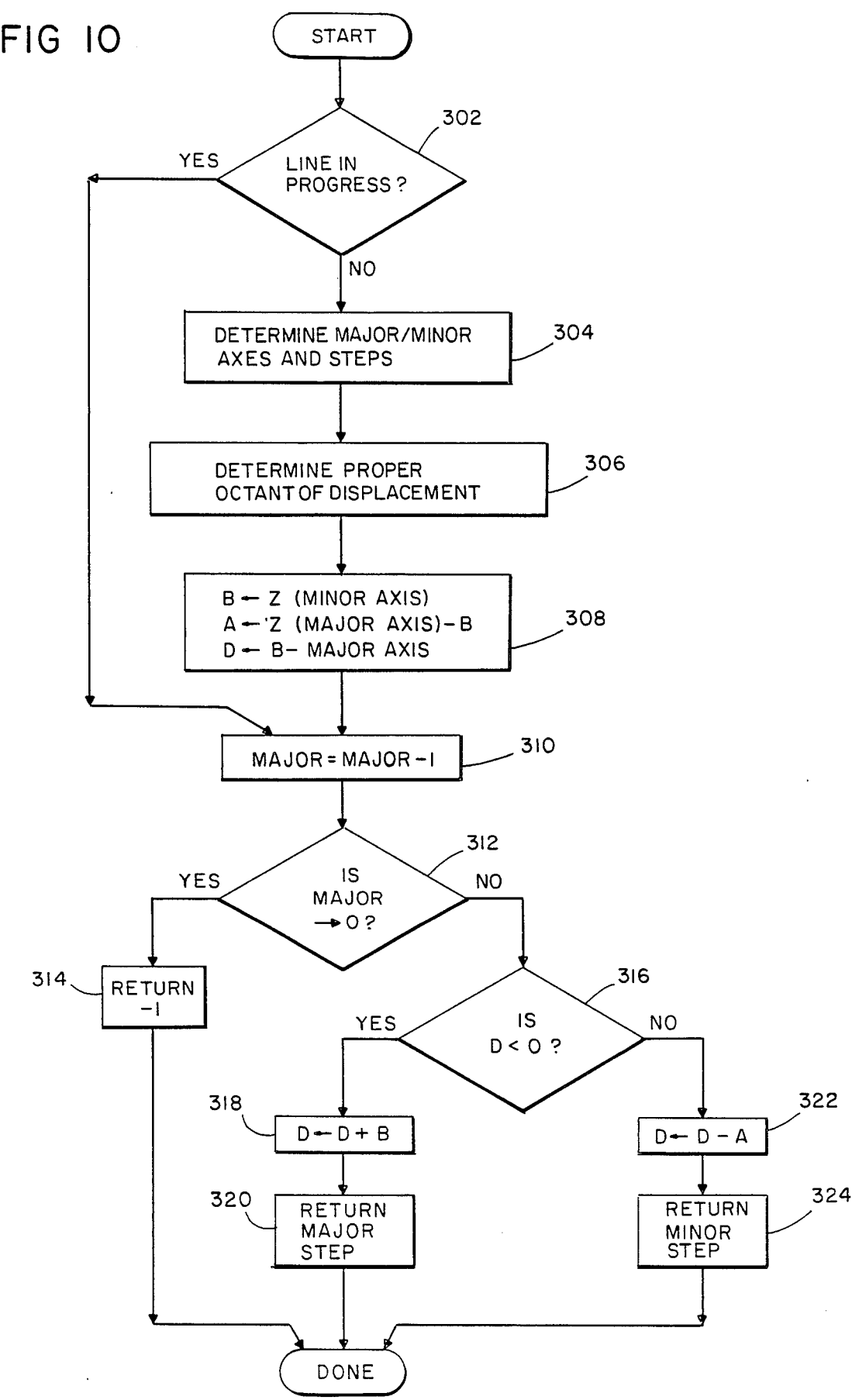
FIG. 10 is a flowchart of step generation.

Referring to FIG. 10, the routine of computing each step along a desired line begins by determining whether the step computations for that line are already in progress (302), that is whether prior steps for that line have already been calculated. If not, the CPU determines which are the major and minor axes for the line and how many major steps and minor steps are required to approximate the line (304), assuming that it lies in the octant ($O_1$, in FIG. 9) in which +x is the major axis. Next, the CPU determines which octant the desired line actually lies in (306). Note that because of the symmetry of the octants, the number of major steps and number of minor steps required to approximate any desired line can be determined as the numbers of steps required to approximate a representative line lying in octant $O_1$. For example, in FIG. 9, if line 270 is the desired line, line 274 is the representative line. Once the major and minor steps of the representative line are determined, they can easily be converted to steps for the desired line by appropriate reflection across a diagonal line and axis swapping. Then the CPU sets up three variables in storage (308): B, A, and D. B is set equal to twice the number of step units spanned by the desired line along the minor axis, A is set equal to twice the number of step units spanned by the desired line along the major axis minus B, and D is set equal to B minus the number of step units spanned by the desired line along the major axis. For example, in FIG. 9, for line 270, B=22, A=42−22=20 and D=1.

Next, the CPU decrements the number of units along the major axis by 1 (310), reflecting that another step is being calculated. Note that regardless of whether the next step is a major step along the major axis or a minor step along the diagonal, the step includes a unit along the major axis. The variable "major" thus keeps track of the number of units remaining along the major axis. If major is then 0, i.e., there are no more major steps (312), a value −1 is returned (314) to the part running process to indicate that the line is finished. On the other hand, if major is not then 0, i.e., there are more major steps remaining, then the CPU determines whether D is less than zero (316). D is a value which represents whether the desired line would be more closely approximated by having the next step be a major step versus a minor step. If D is less than zero (indicating that a major step should be taken), then D is incremented by the value of B (318) and a major step is returned to the part running process (320). That major step is simply a one unit step along the major axis. On the other hand, if D is less than 0, D is decremented by A (322) and a minor step is returned (324). The minor step is simply the combination of a unit step along the major axis and a unit step along the minor axis. The steps which are returned include the magnitude and proper direction along each of the axes. Once the steps are returned the routine of FIG. 10 is ended until called again.

In the case of part commands which specify arcs, each arc is approximated as a succession of short chords using a conventional arc interpolation, for example an interpolation of the type described in C. Bergren, *A Simple Algorithm for Circular Interpolation*, published by Potter Instrument Co. in September 1971.

In general, to cut a part which has been loaded, the CPU every 1/100 second repeats a process of calculating and delivering to the pulse width board over lines 74, 72 the drive magnitude and direction values (hereafter called the current output speed) to be used in the ensuing 1/100 second. The current output speed along each of the three axes is determined by digital feedback loops implemented by the CPU based on the actual and intended current positions and the actual and intended current speeds along each axis. The actual position and speed are derived from the encoder and the intended position and speed are derived from the step buffer.

Figure 11:
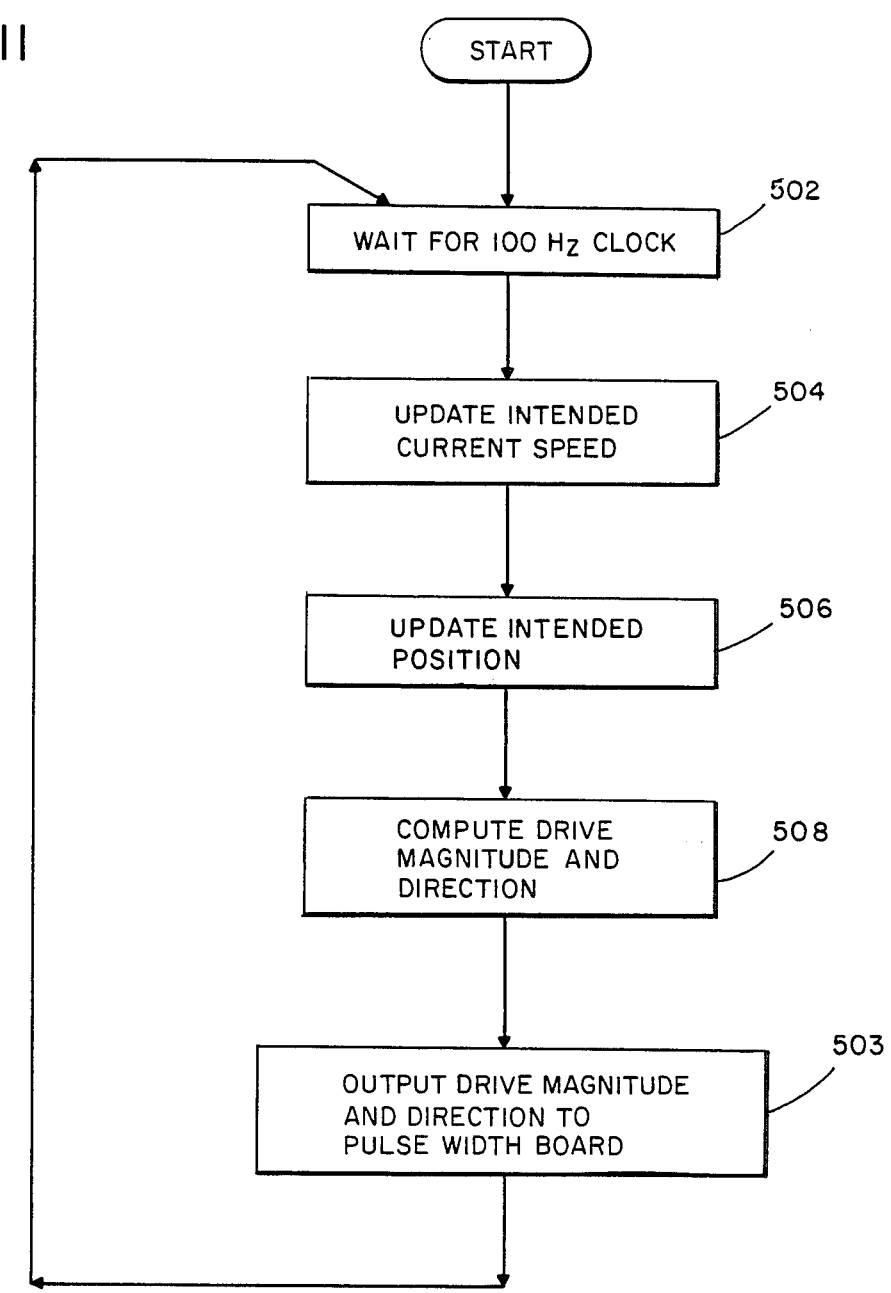
FIG. 11 is a flowchart of drive magnitude and direction output generation.

Referring to FIG. 11, upon receipt of each 100 Hz clock pulse (502) the CPU executes four routines in sequence: (1) an update intended current speed routine (504), (2) an update intended current position routine (506), (3) a compute drive magnitudes and directions routine (508), and (4) an output drive magnitudes and directions to pulse width board routine (503).

The controller is designed to drive the machine at different intended current speeds and to change from one intended current speed to another at appropriate times. The controller starts from and can slow down as far as a so-called creep speed, which is considered to be essentially zero. Zero speed is never actually reached because at zero speed, no steps would be issued and the controller would get stuck. The controller can also accelerate from and slow down to intended current speeds other than creep speed. When changing from a higher speed to a lower speed, in order to begin decelerating at the proper time to reach the lower speed at the place where it is desired, the controller uses a slow down counter. On the other hand when a new higher speed is desired, acceleration begins at the point in the part where the new speed has been programmed to occur. Thus to execute the following sequence:

speed: full
step 1
speed: creep
speed: full
step 2 step 1 is executed at full speed until the point has been reached where it is necessary to decelerate in order to reach creep speed just at the end of step 1. As soon as step 2 begins, speed is accelerated to full speed again.

The term deceleration length is used to refer to the distance required to decelerate from the current output speed to a lower intended current speed at the current acceleration constant (K).

To decelerate, the controller looks ahead in the step buffer to see if a deceleration must occur within the next deceleration length. If so and if the new intended current speed is creep speed, the deceleration begins immediately.

Figure 12:
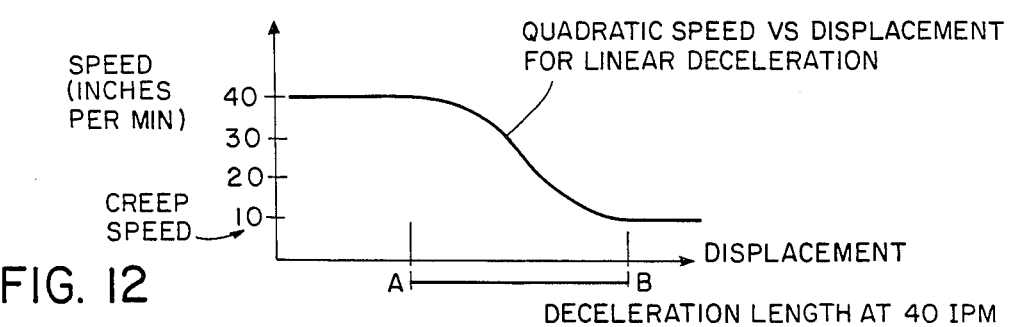
FIGS. 12, 13 are curves of deceleration techniques.

For example, referring to FIG. 12, if creep speed (10 IPM) is the intended current speed beginning at point B, if the current output speed is 40 IPM, and if the deceleration length at 40 IPM is the distance from A to B, then at point A deceleration begins according to a quadratic speed vs. displacement function to produce a linear deceleration.

Figure 13:
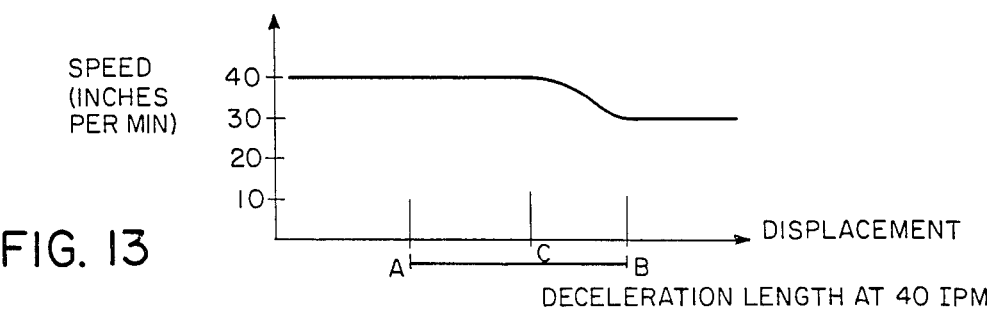

Referring to FIG. 13, deceleration to a speed (e.g., 30 IPM) higher than creep speed would not need to begin at point A, but could wait to point C. To accomplish this, the slowdown counter is loaded with the number of clock ticks that need to occur before the deceleration needs to be started.

Figure 14:
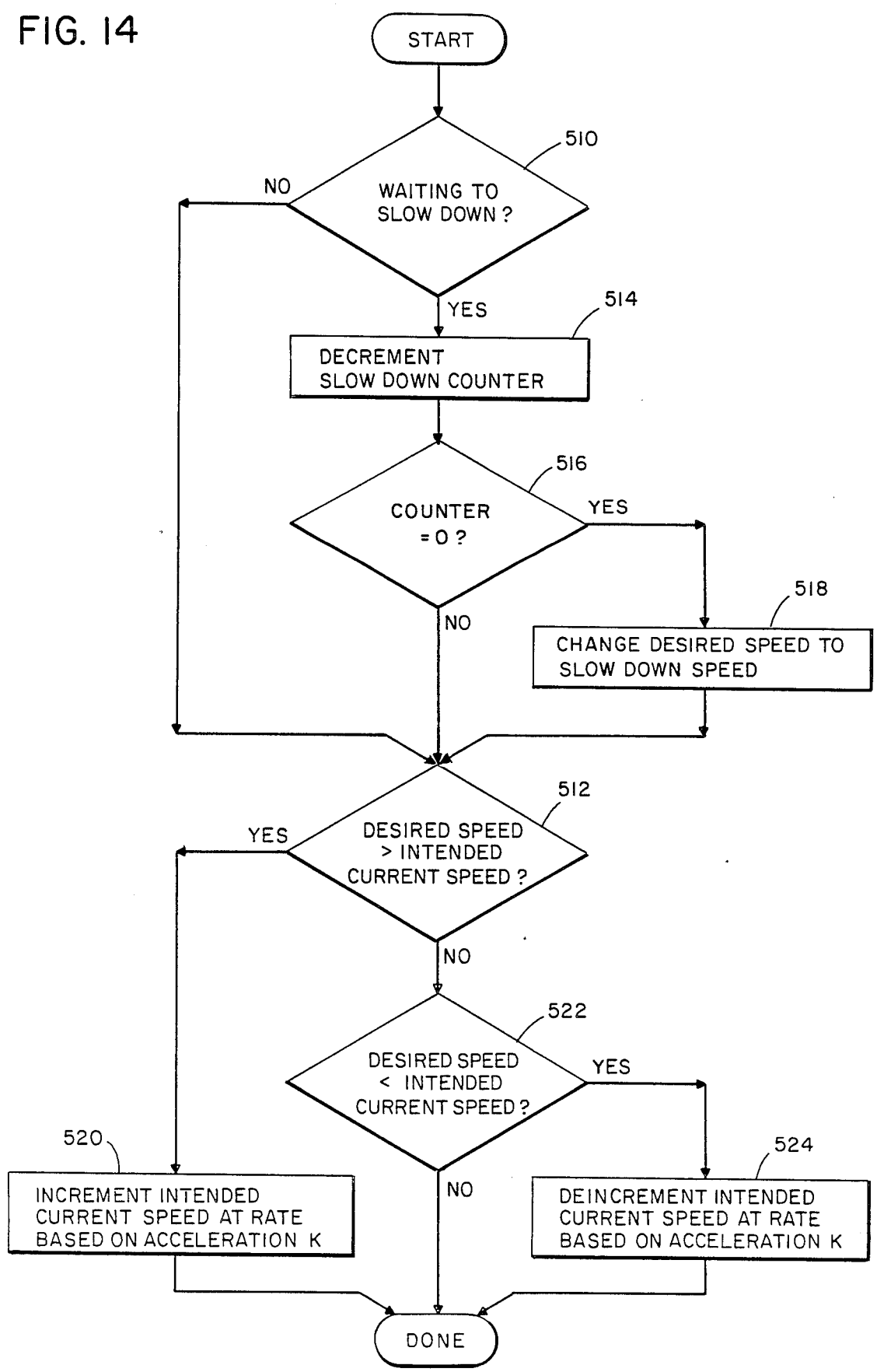
FIG. 14 is a flowchart of intended current speed updating.
Figure 15:
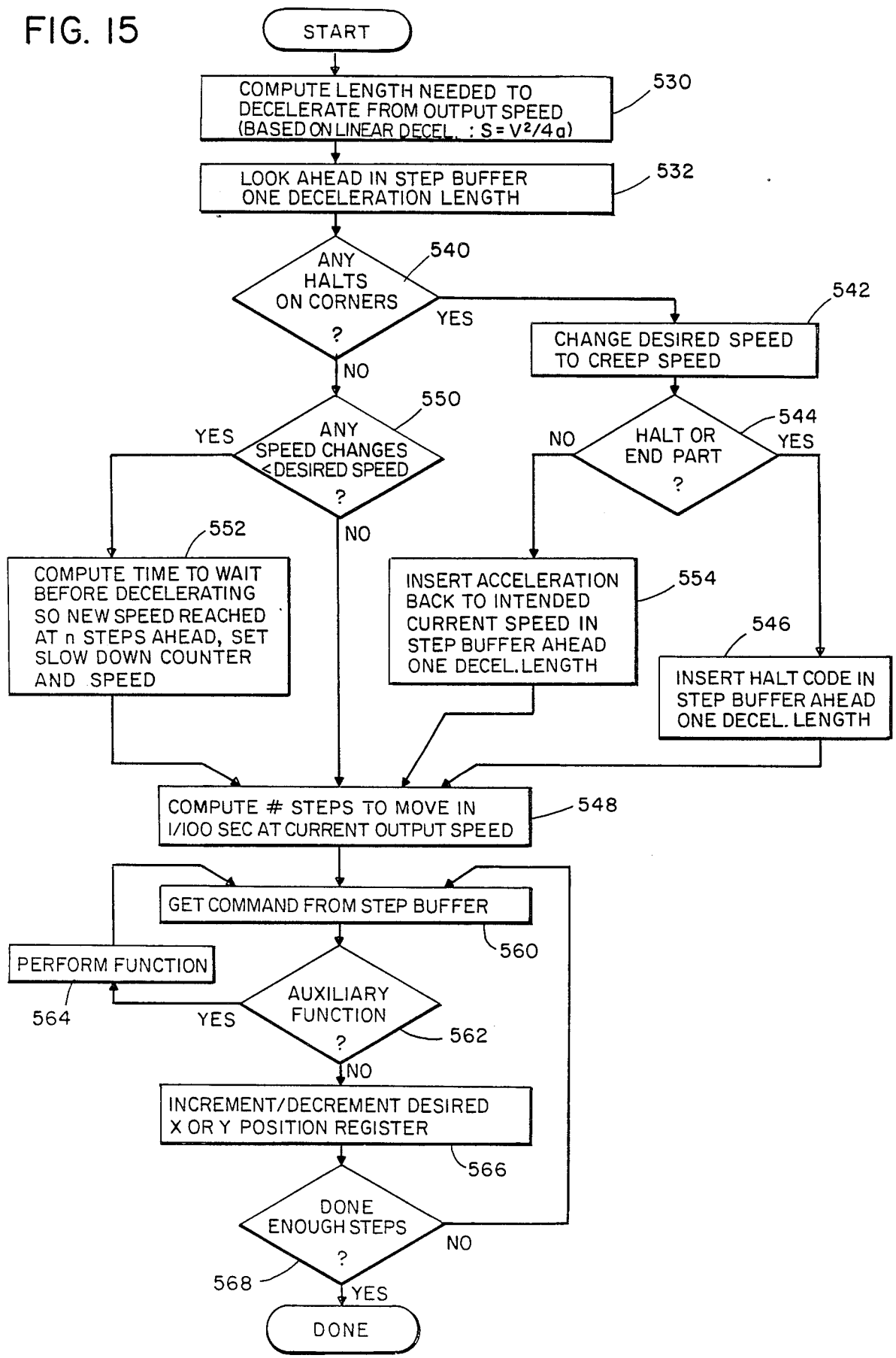
FIG. 15 is a flowchart of intended position updating.

Referring to FIG. 14, the update intended current speed routine begins by checking whether the system is waiting to slow down (510). If so, then first the slowdown counter is decremented (514). If the counter has reached zero (516), indicating that the point has arrived for slowing down, then the desired speed is changed to the slowdown speed (518).

Next the desired speed is compared (512) to the intended current speed. If the desired speed is higher than the current output speed, i.e., acceleration is required, the intended current speed is incremented (520) at a rate based on an acceleration constant K. If the desired speed is less than the current output speed (522), i.e., deceleration is required, the intended current speed is decremented (524) at a rate based on the acceleration constant K.

Figure 16:
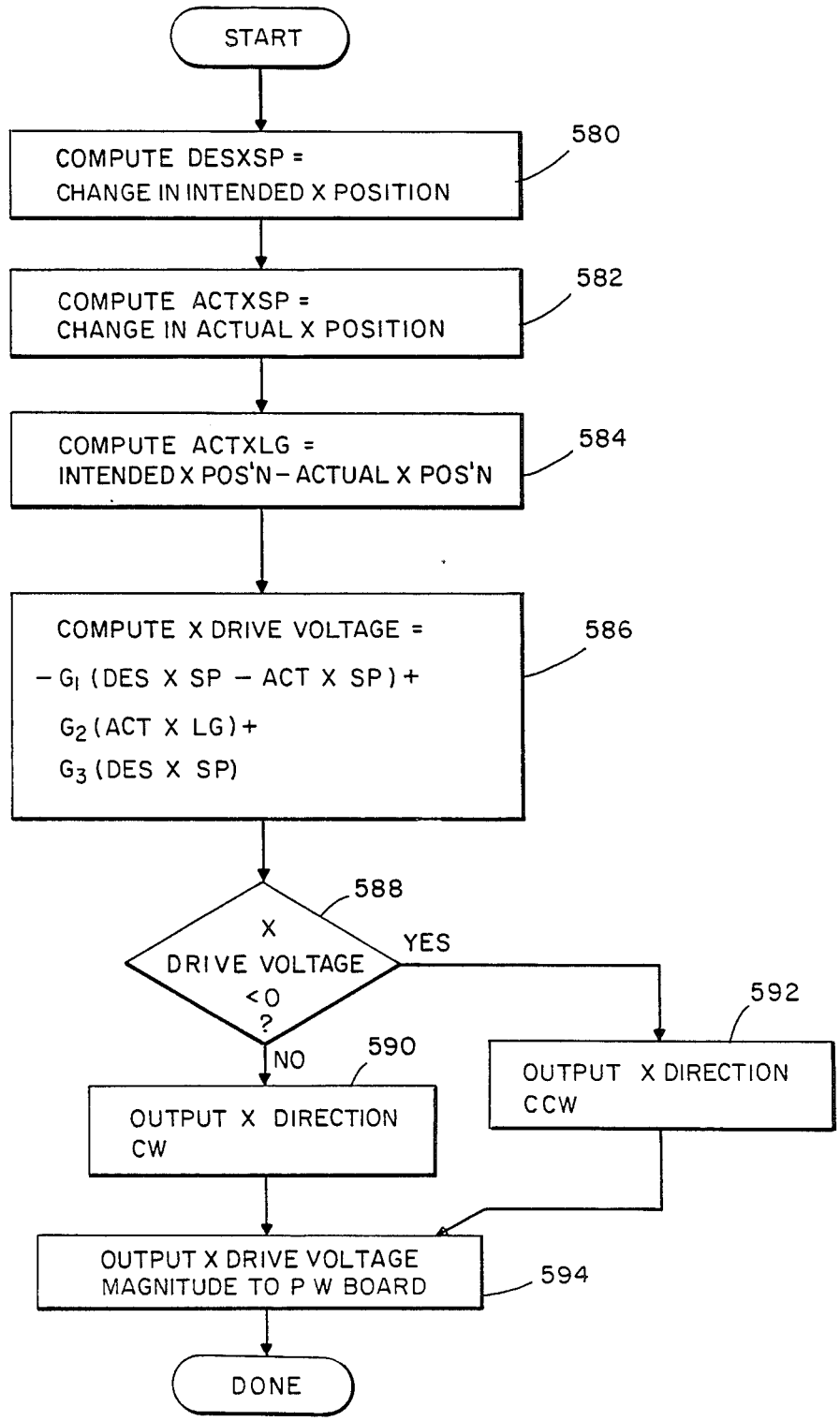
FIG. 16 is a flowchart of drive magnitude and direction computation.

Referring to FIG 16, the update desired position routine begins by checking whether a halt or corner is coming up in the step buffer within the time it takes for the system to decelerate to a halt from its current output speed. First the CPU determines the distance needed to decelerate from the current output speed (530) based on assumed linear deceleration in accordance with $s = v^2/4a$, where v is the speed, a the acceleration and s the distance. Next, the CPU looks ahead in the step buffer a number of steps corresponding to distance s (532) to see if any halts or corners are anticipated to occur within that distance (540).

If so, the desired speed is changed to creep speed (542). If the step buffer indicates that a halt item or end part item is coming up (544), the CPU inserts a halt command in the step buffer at a point corresponding to distance s ahead (546).

Returning again to block 540, if no halts or corners are anticipated, the CPU determines if any speeds lower than the desired speed are anticipated (550). If not, the CPU simply proceeds directly to block 548; otherwise the CPU first calculates how long to wait before decelerating so that the new desired speed will be reached, as desired, n steps ahead. The slowdown counter and desired speed are set accordingly (552).

Returning again to block 544, if no halt or end part is anticipated, but only a corner which is less than one deceleration length ahead, the CPU inserts acceleration back to intended current output speed command in the step buffer at a point one deceleration length ahead (554).

The CPU then calculates how many steps should be taken in the next 1/100 second based on the current output speed (548), where a 45° diagonal minor step is approximated to have a length which is 7/5 the length of a major step. (This approximation, in the worst case, produces an inaccuracy of only 7% in the speed computation.)

There is a limit to the rate at which steps can be output, e.g., a limit of 1500 steps/second. For a high resolution machine with a step size of 1/1000", this would mean a maximum speed of 90 inches per min. At higher speeds less accuracy would be needed.

Controller 30 can produce higher speeds with correspondingly lower accuracy by equating each computed step to a multiple number of machine steps. For example, by equating each computed step to two machine steps, a top speed of 180 in/min. at a resolution of 1/500th inch is achieved. A programmed speed/accuracy parameter having any selected value from 1 to about 1000 is used to specify the number of machine-scale steps which will equate to each computed step. This permits operating the same machine at speeds as high as 90,000 in/min. (85 mph) at 1 inch resolution.

Once the number of steps to be moved in the ensuing 1/100 sec. is determined (548), the CPU enters a loop in which it takes that many steps from the buffer. First, it gets the next command from the step buffer (560). If the next command is an auxiliary function (562), that function is performed (564). Then the CPU gets another command. Otherwise, if the command is not an auxiliary function, the CPU increments or decrements the desired x position and/or desired y position registers either by one, or by a higher number (a speed/accuracy parameter) to effect a different speed and precision range (566). If the number of steps calculated in block 548 have then been processed (568), the routine is ended; otherwise the CPU gets another item from the step buffer. The rate at which the x and y position registers are incremented will govern the speed of motion. To double the speed (but at half the accuracy), one simply increments the registers at double the rate.

Referring to FIG. 17, the compute drive magnitude and direction routine implements the feedback loops by first computing (580) the intended x speed as the change in desired x position which has occurred since the previous calculation done 1/100 second earlier. FIG. 17 shows the computation sequence for the x-axis only; the process is duplicated for the y and z axes. This change, denoted as desxsp, is the number of steps along the x axis which were issued in the update desired position routine since the previous calculation.

Next, the CPU computes the actual speed along the x axis as the change in actual x position during the previous 1/100 sec. based on the encoder feedback signals (582). The change in actual x position is stored as a value actxsp.

Next the CPU computes the lag in x-axis position (584) as the difference between the intended x position (based on the steps issued from the step buffer) and the actual x position (based on the feedback signals from the encoder) and stores it as a value actxlg.

With these three digitally determined quantities (position error, actual speed, and intended current speed) all available internally in controller 30, the current output power signals to the motors are calculated as a combination of three feedback terms. One term is the position error times a gain factor $G_2$. The second term (which is subtracted) is the speed error (i.e., the difference between the intended current speed and the actual machine speed times a gain factor $G_1$). The third term (which is added) is the intended current speed times a gain factor $G_3$. Subtracting the difference between the intended current speed and the actual speed, rather than just subtracting the actual speed produces two desirable effects. In the steady state, there is no subtraction of actual speed and thus no increase in position error. The actual speed feedback still provides stability, as a change in actual speed will produce just as large a change in current output speed signals as in a prior art controller. During periods of acceleration, additional power is supplied to the motors, as the actual speed falls below the intended current speed, thus reducing lag. During periods of deceleration, as the intended current speed goes to zero, a braking effect occurs, caused by reverse voltage applied to the motors.

By adding the third term (a gain factor ($G_3$) times the intended current speed), the steady state position error can be reduced to zero. Since the steady state position error is linearly related to actual speed, each machine has a value for $G_3$ that will (theoretically) result in zero lag for all machine speeds (after acceleration/deceleration). This works well in practice, and results in significantly more accurate positioning. Otherwise, for instance, circles would tend to come out smaller than programmed.

The gain factor $G_3$ is best determined experimentally. This can be done by exercising the machine along each axis, measuring the lag, and computing the appropriate $G_3$. If a controller is to be attached to a particular cutting machine, the parameter can then be programmed into the ROM program for the controller for that machine.

Depending on whether the x drive magnitude (current speed output signal) thus calculated is less than 0 or not (588), the CPU sends a clockwise direction (590) or counterclockwise direction (592) signal over line 72 and sends (594) the x drive magnitude signal over line 74.

Thus the actual position and speed track the intended position and speed. Note that the inertia of the machine is sufficient to smooth out the small linear steps generated by the step-wise linear interpolation algorithm so that a smooth cutting path is obtained.

Referring to FIG. 17, controller 30 in effect then implements a feedback control system in which the current output power delivered to a pulse width modulator and switching amplifier 600 is based on three terms which take into account the actual and intended current position and the actual and intended current speed. The calculation of current speed is represented by a digital speed calculator 602. A dithering control 604 causes dithering when the current output power is zero. A shut off control 606 drives the current output power positively to zero when noise generating events are occurring. The intended current position and speed are provided by an intended current speed and position generator 608 based on steps drawn from a step buffer 610 and subject to adjustments dictated by an accuracy/speed control 612, an accelerate/decelerate control 614, and a halt/corner control 616. Step buffer 610 is loaded by a step generator 618, based on part commands comprising a part program 620.

Among the advantages of the invention are the following. Because the pulse width signals from the digital switching amplifier are delivered directly to the motors, without an intervening conversion to analog form and back again, susceptibility to noise is reduced, and the control loop becomes accessible to a variety of digital control techniques. Because the actual speed is calculated digitally and available within the controller, more sophisticated control loops are possible. A feed forward term based on speed can be included to limit speed-related error. Because a modulation frequency of 1000 hertz is used, a nonsynchronous discontinuous input to the pulse width modulator can be used, but the modulation frequency is still low enough not to require expensive circuitry to enable precise modulation. Dithering keeps the motors warm to limit shifts in gain which might otherwise occur and to preclude the need for a warm up period before cutting begins. Because power to the motor can be shut off completely, positional errors which might otherwise arise from noise, such as when an arc torch is started, can be avoided. The use of a step wise linear interpolation algorithm simplifies implementation using an 8-bit microprocessor. Higher speeds, albeit with less accuracy are easily obtainable, without further hardware and without increasing the speed at which steps are computed, by changing the speed/accuracy parameter. Elimination of an independent tachometer and its associated electronics and elimination of all other analog components eliminates the inherent noise susceptibility and drift of such components. Digital setting of gain factors eliminates drift.

Other embodiments are within the following claims. For example, the cutting machine could be capable of cutting along fewer or more than three dimensions and machines for performing functions other than cutting could alternately be controlled.

We claim:

1. Apparatus to control the movement of a tool relative to a workpiece along each one of a plurality of axes in accordance with a predetermined sequence of intended speeds and positions, said movement along each axis being produced by an electromechanical actuator, said apparatus comprising a digital pulse generator arranged to generate a train of periodic digital output pulses and to deliver said pulse train directly to said actuator, and a digital controller arranged to receive command signals that represent said sequence of intended speeds and positions, and to generate corresponding digital control signals for said digital pulse generator to control the widths of said digital output pulses in said pulse train so that electrical energy is carried in said pulse train at rates which will cause said actuator to tend to produce said sequence of intended speeds and positions, said digital controller being further arranged to approximate said intended positions as a hypothetical series of connected linear steps of movement, and said intended speeds as hypothetical rates at which said linear steps occur, and to base said digital control signals in part on said steps and said rates.

2. The apparatus of claim 1 further comprising a digital encoder arranged to sense the position of said tool relative to said workpiece and to provide corresponding digital actual position signals, and wherein said digital controller is further arranged to base said digital control signals in part on said digital actual position signals.

3. The apparatus of claim 2 wherein
said digital controller comprises
a digital speed calculator arranged to provide digital actual speed signals based on a time sequence of said digital actual position signals, and wherein
said digital controller is further arranged to base said digital control signals on said digital actual speed signals.

4. The apparatus of claim 3 wherein
said digital controller is further arranged to base said digital control signals on a speed error gain factor times the difference between said digital actual speed signals and a current intended speed signal.

5. The apparatus of claim 4 wherein
said speed error gain factor reflects a characteristic speed error of said movement of said tool.

6. The apparatus of claim 2 wherein
said digital controller is further arranged to base said digital control signals on a lag gain factor times the difference between said digital actual position signals and a current intended position signal.

7. The apparatus of claim 1 wherein
said pulse train has a frequency in the audible range higher than 60 hertz, preferably between 100 hertz and 5 kilohertz, most preferably 1 kilohertz.

8. The apparatus of claim 1 wherein
said digital pulse generator is further arranged to generate said pulses with a first polarity for motion in one direction along said axis and with the opposite polarity from said first polarity for motion in the opposite direction along said axis.

9. The apparatus of claim 1 wherein
said digital controller further comprises a dithering control for causing said digital pulse generator to deliver digital output pulses that maintain said actuator in a warmed-up condition, but do not cause movement along said axis.

10. The apparatus of claim 9 wherein
said dithering controller causes said digital generator to deliver alternate digital output pulses of a first polarity and intervening digital output pulses of a polarity opposite to said first polarity.

11. The apparatus of claim 8 wherein
said digital pulse generator is further arranged to be capable of delivering no output pulses and hence no energy to said actuator, and
said digital controller comprises a shut off control which causes said digital generator to deliver no output pulses during periods of signal interference.

12. The apparatus of claim 1 wherein said digital pulse generator comprises
a pulse width modulator which generates digital logic pulses, and
a digital switching amplifier which receives and amplifies said logic pulses to form said digital output pulse train.

13. The apparatus of claim 1 wherein
said digital pulse generator generates said pulse train at a characteristic modulation frequency, and
said digital controller is further arranged to update said digital control signals at an update rate which is at least an order of magnitude slower than said modulation frequency.

14. The apparatus of claim 13 wherein said update rate is 100 hertz.

15. The apparatus of claim 1 wherein
said digital controller comprises a step generator which operates in a succession of cycles and in each cycle counts a number of steps corresponding to a current intended position and a current intended speed.

16. The apparatus of claim 15 wherein the size of each said step is sufficiently small relative to the inertia characterizing the movement of said tool so that the hypothetical steps result in smooth tool movement.

17. The apparatus of claim 16 wherein each said step is 0.0005".

18. The apparatus of claim 16 wherein
said digital controller further comprises a step generator to generate said steps by a step-wise linear interpolation algorithm.

19. The apparatus of claim 1 wherein said digital controller comprises
a speed/accuracy control which governs the speed and accuracy of said movement based on a selectable speed/accuracy parameter by adjusting the rates at which said steps occur.

20. The apparatus of claim 19 wherein for a given said speed/accuracy parameter said speed can be varied over a range by adjusting the widths of said pulses, and said range can be varied by adjusting said speed/accuracy parameter.

21. The apparatus of claim 19 wherein said speed can be as high as 90,000 inches per minute.

22. The apparatus of claim 1 wherein said digital controller comprises
an acceleration/deceleration control which triggers changes in said rates at which said steps occur to cause desired changes in said intended speeds.

23. The apparatus of claim 1 wherein said actuator is a linear torque DC motor.

24. The apparatus of claim 1 wherein there are two said axes.

25. The apparatus of claim 1 wherein there are three said axes.

26. The apparatus of claim 1 wherein said tool comprises a torch and said workpiece comprises a sheet of metal from which a part is to be cut.

27. The apparatus of claim 1 wherein said digital controller comprises a programmed microprocessor.

28. The apparatus of claim 1 wherein
said digital controller further comprises a dithering control for causing said digital pulse generator to deliver digital output pulses that maintain said actuator in a warmed-up condition, but do not cause movement along said axis.

29. The apparatus of claim 28 wherein
said dithering controller causes said digital generator to deliver alternate digital output pulses of a first polarity and intervening digital output pulses of a polarity opposite to said first polarity.

30. Apparatus to control the movement of a tool relative to a workpiece along each one of a plurality of axes in accordance with a predetermined sequence of intended speeds and positions, said movement along each axis being produced by an electromechanical actuator, said apparatus comprising
a digital pulse generator arranged to generate a train of periodic digital output pulses and to deliver said pulse train directly to said actuator, and
a digital controller arranged to receive command signals that represent said sequence of intended speeds and positions, and to generate corresponding digital control signals for said digital pulse generator to control the widths of said digital output pulses in said pulse train so that electrical energy is carried in said pulse train at rates which will cause said actuator to tend to produce said sequence of intended speeds and positions,
said digital pulse generator being further arranged to be capable of delivering no output pulses and hence no energy to said actuator,
said digital controller comprising a shut-off control which causes said digital generator to deliver no output pulses during periods of signal interference.

31. A method of controlling the movement of a tool relative to a workpiece along each one of a plurality of axes in accordance with a predetermined sequence of intended speeds and positions, said movement along each axis being produced by an electromechanical actuator, said method comprising
generating a train of periodic digital output pulses and delivering said pulse train directly to said actuator,
approximating said intended positions as a hypothetical series of connected linear steps of movement, and said intended speeds as hypothetical rates at which said linear steps occur, and basing said digital control signals in part on said steps and said rates, and
in response to command signals that represent said sequence of intended speeds and positions, generating corresponding digital control signals for said digital pulse generator to control the widths of said digital output pulses in said pulse train so that electrical energy is carried in said pulse train at rates which will cause said actuator to tend to produce said sequence of intended speeds and positions.

* * * * *